United States Patent
Bidan et al.

(10) Patent No.: US 8,583,934 B2
(45) Date of Patent: Nov. 12, 2013

(54) ACCESS CONTROL TO DATA PROCESSING MEANS

(75) Inventors: Christophe Bidan, Thorigne-Fouillard (FR); David Naccache, Paris (FR); Pierre Girard, La Destrousse (FR); Pascal Guterman, Roquevaire (FR); Ludovic Rousseau, Aubagne (FR)

(73) Assignee: Gemalto SA, Meudon (FR)

( * ) Notice: Subject to any disclaimer, the term of this patent is extended or adjusted under 35 U.S.C. 154(b) by 2144 days.

(21) Appl. No.: 10/311,698

(22) PCT Filed: Jun. 20, 2001

(86) PCT No.: PCT/FR01/01945
§ 371 (c)(1),
(2), (4) Date: May 30, 2003

(87) PCT Pub. No.: WO01/99064
PCT Pub. Date: Dec. 27, 2001

(65) Prior Publication Data
US 2003/0188170 A1    Oct. 2, 2003

(30) Foreign Application Priority Data
Jun. 20, 2000    (FR) ...................................... 00 07886

(51) Int. Cl.
*G06F 21/00*    (2013.01)
*G06F 7/04*    (2006.01)

(52) U.S. Cl.
USPC ................................. 713/182; 726/9; 726/20

(58) Field of Classification Search
USPC .................................. 713/189, 182; 726/9, 20
See application file for complete search history.

(56) References Cited

U.S. PATENT DOCUMENTS

| | | | |
|---|---|---|---|
| 4,786,790 A | | 11/1988 | Kruse et al. |
| 4,907,272 A | | 3/1990 | Hazard et al. |
| 5,394,471 A | * | 2/1995 | Ganesan et al. .............. 713/183 |
| 5,475,756 A | * | 12/1995 | Merritt ............................ 705/73 |
| 5,483,597 A | * | 1/1996 | Stern .............................. 380/30 |
| 5,581,615 A | * | 12/1996 | Stern ............................. 713/180 |
| 5,588,056 A | * | 12/1996 | Ganesan ....................... 713/183 |
| 5,590,199 A | * | 12/1996 | Krajewski et al. ............ 713/159 |
| 5,604,801 A | * | 2/1997 | Dolan et al. ................... 713/159 |
| 5,608,801 A | * | 3/1997 | Aiello et al. .................... 380/46 |
| 5,623,545 A | * | 4/1997 | Childs et al. ...................... 380/2 |
| 5,664,016 A | * | 9/1997 | Preneel et al. .................. 380/28 |
| 5,751,812 A | * | 5/1998 | Anderson ..................... 713/155 |
| 5,778,069 A | * | 7/1998 | Thomlinson et al. ......... 380/262 |
| 5,778,071 A | * | 7/1998 | Caputo et al. ................. 713/159 |

(Continued)

FOREIGN PATENT DOCUMENTS

| | | |
|---|---|---|
| DE | 39 04 215 | 8/1989 |
| EP | 1 004 980 | 5/2000 |
| FR | 2 496 294 | 6/1982 |

*Primary Examiner* — Techane Gergiso
(74) *Attorney, Agent, or Firm* — Buchanan Ingersoll & Rooney PC

(57) ABSTRACT

A method for preventing secret code manipulation in a data processing device, such as a smart card, to which a presented code is applied. Prior to implementation of a code transforming function in the processing device, the secret code is transformed into a transformed secret code in the card. For each use of the card, the presented code is transformed into a transformed presented code in accordance with the implemented transformation function. A comparison of the transformed secret code with the transformed secret code in the card is then performed.

11 Claims, 2 Drawing Sheets

(56) References Cited

U.S. PATENT DOCUMENTS

| | | | | |
|---|---|---|---|---|
| 5,887,131 A | * | 3/1999 | Angelo | 726/20 |
| 6,021,201 A | | 2/2000 | Davis et al. | |
| 6,038,551 A | * | 3/2000 | Barlow et al. | 705/41 |
| 6,061,449 A | * | 5/2000 | Candelore et al. | 380/28 |
| 6,067,621 A | * | 5/2000 | Yu et al. | 713/172 |
| 6,240,184 B1 | * | 5/2001 | Huynh et al. | 380/206 |
| 6,257,486 B1 | * | 7/2001 | Teicher et al. | 235/380 |
| 6,304,658 B1 | * | 10/2001 | Kocher et al. | 380/30 |
| 6,370,649 B1 | * | 4/2002 | Angelo et al. | 726/18 |
| 6,453,416 B1 | * | 9/2002 | Epstein | 713/170 |
| 6,460,138 B1 | * | 10/2002 | Morris | 713/184 |
| 6,470,454 B1 | * | 10/2002 | Challener et al. | 726/17 |
| 7,007,164 B1 | * | 2/2006 | Euchner | 713/168 |
| 7,089,595 B1 | * | 8/2006 | Grawrock | 726/36 |
| 2003/0012382 A1 | * | 1/2003 | Ferchichi et al. | 380/270 |

* cited by examiner

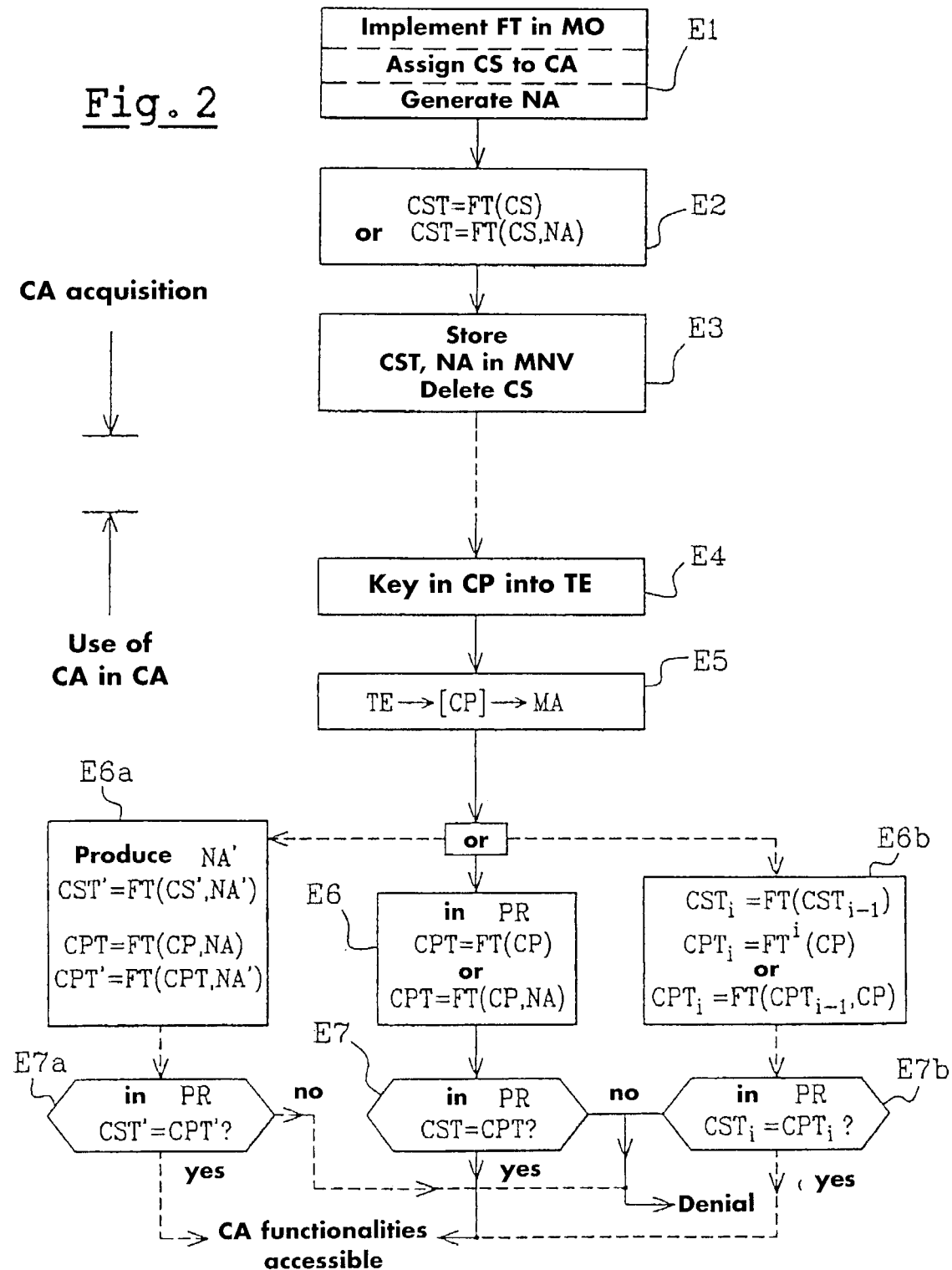

ACCESS CONTROL TO DATA PROCESSING MEANS

This disclosure is based upon French Application No. 00/07886, filed on Jun. 20, 2000 and International Application No. PCT/FR01/01945, filed Jun. 20, 2001, the contents of which are incorporated herein by reference.

BACKGROUND OF THE INVENTION

The present invention relates in general terms to any electronic data processing means of which the functionalities, or services which are related thereto, are accessible by a confidential code, also referred to as a password or secret code, which is most often received by the processing means following keying-in on the keyboard of an accepting means of the processing means.

For example, the data processing means is a microcontroller card, also referred to as an integrated circuit card or smart card, such as a credit card for a bank terminal or an electronic purse card for a point-of-sale terminal, or for any other terminal such as a mobile radiotelephone terminal equipped with an add-on card reader, or else such as a SIM (Subscriber Identity Module) identity card in a mobile radiotelephone terminal.

More particularly, the invention relates to the security of controlling access to the functionalities of the smart card by, a confidential code received thereby so as to compare it with a secret confidential code associated with the smart card and currently pre-stored therein.

An attacker, an ill-intentioned person, wishing to know the secret confidential code of a smart card, can carry out a Single Power Analysis (SPA) by connecting a voltage-measuring apparatus to the electrical interface between the smart card and its accepting terminal.

In a smart card according to the prior art, the secret confidential code pre-stored in a non-volatile memory of the smart card is manipulated during verification of any confidential code presented with a view to authenticating the true holder of the smart card. In particular, the processor in the card reads the secret code from the non-volatile memory and compares it with the received code written temporarily into the RAM memory of the smart card.

Current smart cards thus present possibilities of leakages of information resulting from the recording of energy consumption characteristics of the smart card.

SUMMARY OF THE INVENTION

The present invention aims to increase the security of checking of the confidential code received by a data processing means, such as a smart card, and to avoid any manipulation of the secret code in the data processing means.

To that end, a method for accessing a data processing means associated with a secret confidential code and accessible by applying thereto a confidential code presented by an accepting means is characterised in that it comprises the following steps:

first, implementation of a code transformation function in the processing means, and then transformation of the secret code into a transformed secret code according to the transformation function and storing of the transformed secret code in the processing means; and at each use of the processing means, transformation of the presented code into a transformed presented code according to the transformation function implemented in the processing means, and comparison of the transformed secret code with the transformed presented code in the processing means.

Thus, during the use of the processing means, such as a smart card, the secret code is not stored therein and is therefore not manipulated in the card during any presentation of the presented confidential code.

As will be seen in detail subsequently, the transformation function can be irreversible, a hashing, linked to a random number fixed at the time of creation of the card or else dependent upon a second random number variable at each presentation of the presented code, applied iteratively according to the number of previous presentations of the presented code, a predetermined code part permutation, or a homomorphic function. Certain of these transformation function characteristics can be combined with one another.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which FIG. 2 is an algorithm of the main steps of the access control method according to a number of embodiments of the invention.

DETAILED DESCRIPTION

Figure 1:
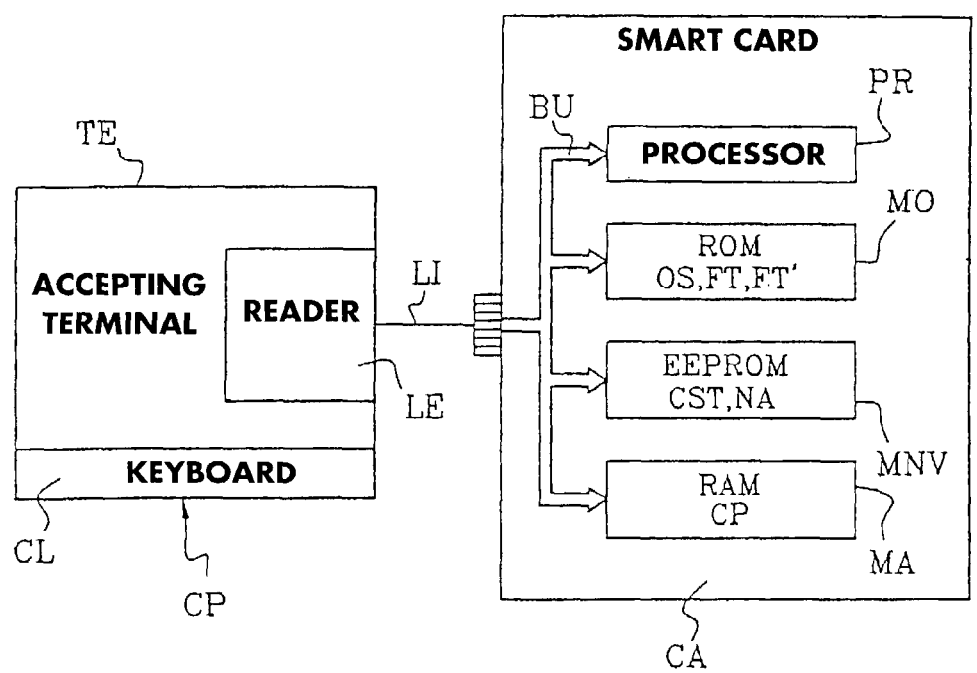
FIG. 1 is a schematic block diagram showing a system for implementing the access control method according to the invention within the context of a smart card.

According to the embodiment illustrated in FIG. 1, an electronic data processing means is constituted by a smart card (chip card) CA, the "chip" of which consists of a microcontroller. Schematically, the microcontroller comprises a central processing unit CPU formed by a microprocessor PR, a ROM type memory MO, including an operating system OS of the card and in particular specific communication and authentication application algorithms, a programmable and erasable type non-volatile memory MNV, such as an EEPROM memory, which contains data in particular connected with the card holder and the card supplier, and a RAM type memory MA intended to receive in particular data from an accepting terminal TE for the card. All the components PR, MO, MNV and MA are interconnected by an internal bus BU.

The accepting terminal TE, such as a bank terminal or a telephone terminal, is equipped with a keyboard CL in order, in particular to key in a confidential code CP, also referred to as a submitted code, to be presented to the card. Into a reader LE of the terminal TE there is inserted part of the card CA containing the microcontroller and typically bearing eight electrical contacts of an electrical link LI between the reader LE and the bus BU internal to the card CA when the card is of the type with contacts.

With reference now to FIG. 2, the access control method according to a preferred embodiment of the invention for the smart card CA shown in FIG. 1 comprises essentially seven steps E1 to E7.

The first steps E1 to E3 are first carried out, at the premises of the card supplier, at the time of manufacture of the card and then at the time of acquisition of the card CA, for example at the time of subscription to a service accessible by the functionalities of the card.

At the time of manufacture of the card, a predetermined confidential code transformation function FT for subsequently: transforming the presented confidential code CP in the card into a transformed presented code CPT, as will be seen later, is implemented in the memory MO of the card. The card CA is delivered with the implemented transformation function FT by the card manufacturer to the card supplier. According to data of the card manufacturer in particular, the card supplier assigns a preferably encrypted secret confidential code CS, for example having four digits, to the card CA, which is decrypted at the step E1.

Immediately, the processor PR of the card transforms the secret confidential code CS into a transformed secret code CST=FT(CS) according to the predetermined transformation function FT, a number of examples of which will be described in detail in the remainder of the description. At the step E3, the transformed secret code CST is written into the non-volatile memory MNV of the card CA. The secret code CS is thus not kept in clear in the card.

Thus, the transformation of the secret confidential code, which was constantly contained in non-volatile memory in the smart cards of the prior art, into the transformed secret code CST is carried out before any presentation of the presented code CP to the card, and the transformed secret code CST, and not the secret code, is kept in non-volatile memory MNV.

The steps E4 to E7 are performed after insertion of the card CA into the reader LE of the accepting terminal TE which is thus connected by the electrical link LI and the internal bus BU to the microcontroller of the card CA.

Each time the card is used, a presented code CP, which must normally be identical to the secret code, is keyed in on the keyboard CL of the terminal TE at the step E4 in order to verify the presented code in the card CA. Either as the digits of the presented code, for example four in number, are keyed in, or as a whole, the terminal TE transmits the presented code CP to the card CA through the link LI and the bus BU in order that it is written into the RAM memory MA, at the step E5.

At the following step E6, the processor PR transforms the presented code CP recorded in the memory MA into a transformed presented code CPT according to the transformation function FT implemented in the card CA.

Finally, the processor PR reads the transformed secret code CST from the memory MNV and compares it with the transformed presented code CPT which has just been determined, at the step E7. If the compared codes CST and CPT are identical, the functionalities of the card CA are accessible, for example for accessing a service, such as a payment service or a telephone service. Otherwise, when the compared codes CST and CPT are different, a limited number of other attempts to key in another presented code can be made.

According to a first embodiment, the code transformation function FT is a hashing H. For example, the four-bit word of each of the four digits, or more generally of the octet of one of the characters, of the confidential code CS, CP is transformed by hashing into a number of octets, typically a few tens of octets, and the transformed code CST, CPT comprises four sets of a few tens of octets.

Moreover, the hash function H does not have a reciprocal function, that is to say it is irreversible. Such a function is also referred to as a "one-way function" which is a function which is relatively easy to calculate but considerably more difficult to reverse. In other words, there is no function $H^{-1}$, or it is very difficult to find a function $H^{-1}$ such that:

$$CF=H^{-1}[H(CF)],$$

where CF represents any confidential code whatsoever.

The one-way nature of the hash function thus prevents decryption of the transformed code CST=H(CS) stored in the card CA in order to find the original secret code CS.

Hashing makes it possible to avoid in particular a search for a confidential code character by character, that is to say octet by octet. The knowledge of one hashed character does not enable the other characters of the secret code to be deduced.

According to a second embodiment, the code transformation function FT is applied to the confidential code CS, CP and a random number NA. The transformation function is for example a logic function, such as the Exclusive-OR function (XOR).

The transformed code CST, CPT results from application of the respective confidential code CS, CP and a random number NA to the transformation function FT. The random number NA is produced by a random generator associated with the processor PR, once and for all at the creation of the card CA, at the time of assigning and writing of the secret code CS at the step E1. The processor PR transforms the secret code CS into a transformed secret code CST=FT(CS, NA) at the step E2 in order to store it with the random number NA in the memory MNV.

For example, the transformation function FT can be a combination of the confidential code CS, CP and the random number NA. The random number NA can be a diversification element of the secret code CS.

At the step E6, the processor PR reads not only the presented code CP from the memory MA but also the random number NA from the memory MNV so as to produce the transformed presented code CPT=FT(CP, NA).

According to this second embodiment, two smart cards associated with identical secret confidential codes are associated with different random numbers. The random numbers being a priori different for the two cards, the effects of manipulating these random numbers cannot be used for characterisation of the cards. This is because the Single Power Analysis of the smart card is not representative of the secret code in clear, but is representative of the secret code transformed according to a transformation known to the attacker. The information on the secret code CS cannot be deduced from the transformed secret code CST because the diversification element NA is not known by the attacker.

Preferably, there is a respective random number NA corresponding to each secret code CS. Thus advantageously, when the secret code associated with a card is modified, the random number NA is also modified. For example if two digits of a secret code are reversed, the two random numbers corresponding to these two secret code versions are different. This variant makes it possible to avoid a random number in a first card being recognised by means of manipulation of the random number in another card associated with a confidential code common with the first card.

According to a third embodiment, the number NA is generated initially and a second random number NA' is produced by the random generator associated with the processor PR in the card CA, before the transformation of the presented code CP, at each verification of the presented code CP. The steps E6 and E7 are then replaced by steps E6a and E7a also shown in FIG. 2. On the one hand, the transformation function is applied to the previously stored transformed secret code CST and to the second random number NA' in order to determine a second transformed secret code CST'=FT(CST, NA'). On the other hand, the transformation function is applied a first time to the received presented code CP and to the previously produced first random number. NA in order to produce an intermediate transformed presented code CPT'=FT(CP, NA), and then applied a second time to the intermediate transformed presented code CPT and to the second random number NA' in order to produce the transformed presented code CPT'=FT(FT(CP, NA), NA')=FT(CPT, NA'). Then the codes CST' and CPT' are compared at the step E7a.

The third embodiment of the method according to the invention guarantees that, within the smart card, there is never the same value of transformed confidential code CST'; and therefore that the verification of the presented confidential code CP is never carried out in the same way in the smart card CA.

For example, the transformation function FT is a simple arithmetic operator such as addition, that is:

$$CST'=CST+NA'$$

with $$CST=CS+NA$$

and NA in memory MNV, and $$CPT=(CP+NA)+NA'.$$

A fourth embodiment close to the last variant described above consists, after the first verification of the presented code CP resulting from the comparison of the transformed secret code CST=FT(CS) and the transformed presented code CPT=FT(CP), of storing the transformed secret code CST and, for each presentation of the presented code, applying the code transformation function FT to the previously stored transformed secret code. Thus, for a second presentation, the processor PR compares the transformed codes $CST_2$=FT(CST), which is stored, and $CPT_2$=FT(CPT), then for a third presentation following a second positive verification, compares the transformed codes $CST_3$=FT($CST_2$), which is stored, and $CPT_3$=FT($CPT_2$)=FT(FT(CPT))=FT(FT(FT(CP))), and so on at each presentation of the presented code, the transformed secret code $CST_i$ is stored and compared with the transformed presented code $CPT_i$=$FT^i$ (CP) resulting from the previous applications. After each verification, the value of the transformed secret code which is stored in the memory MNV is different from that which was stored at the previous verification.

In the fourth embodiment, as shown at steps E6b and E7b replacing the steps E6 and E7 in FIG. 2 from the second presentation, the processor PR, at the $i^{th}$ presentation of the code CP in the card CA, applies the function FT i times to the presented code CP which can be relatively long; for example the function FT is a function modulo a prime number P.

In order to reduce the calculation time of the function $FT^i$, the function FT can be the exponent function modulo the predetermined integer number P. Thus, at each presentation of the presented code, the previous applications of the transformation function to the presented code CP are replaced in the processor PR by an application of the transformation function to the last presented code $CPT_{i-1}$ and to the presented code CP in order to produce the transformed presented code $CPT_i$=FT($CPT_{i-1}$, CP)=FT[$(CPT)^{i-1}$, CP] modulo P, instead of applying the function FT i times to the presented code CP. Then, when at the end of the comparison (step E7b) the compared transformed, codes $CST_i$ and $CPT_i$ are identical, the latter are stored in the memory MNV in place of the previous codes $CST_{i-1}$ and $CPT_{i-1}$.

According to another example, the code transformation function FT can be a simple arithmetic function, such as addition $CPT_i$=(CP+$CPT_{i-1}$) modulo P.

In a variant, instead of storing the transformed presented code $CPT_i$, the applications of the transformation function to the presented code CP are replaced by an application of a transformation function equivalent to the $i^{th}$ iteration $FT^i$ of the transformation function in order to produce a transformed presented code $CPT_i$. This variant thus concerns a function $FT^i$ directly dependent on the index i and on the presented code. For example, the function FT is the addition of a random number NA, that is $$CST_i=CST_{i-1}+NA,$$

and $$CPT_i=CP+i\cdot NA.$$

At the end of these two transformations, the number i of iterations is stored with the transformed secret code $CST_i$ resulting from the previous application in the memory MNV, and the transformed presented code $CPT_i$ is compared with the stored transformed secret code $CST_i$.

As for the production of a random number at each presentation of the code CP, the determination of the transformed codes $CPT_i$ and $CST_i$ in a manner different from that of the transformed codes $CPT_{i-1}$ and $CST_{i-1}$ at the previous presentation ruins any deduction of the transformed code from the previous transformed code which depends on the number of presentations of the presented code. Thus, at each presentation, the stored transformed code is different from that stored at the previous presentation.

According to a fifth embodiment, each code is considered as divided into a number of parts, such as four digit octets for example. At the start of the method, the secret code CS is transformed by applying thereto a code transformation function FT so as to change the successive order of its octets, that is for example the transformed secret code CST resulting from the following predetermined permutation:

$$CST=FT[CS(OS1, OS2, OS3, OS4)]=(OS2, OS4, OS1, OS3).$$

At the time of the first presentation of the presented code CP, the same permutation is applied to the code CP by modifying the order of its octets OP1 to OP4:

$$CPT=FT[CP(OP1, OP2, OP3, OP4)](OP2, OP4, OP1, OP3).$$

During the first comparison at the step E7, the second octets OS2 and OP2 are compared, then the fourth octets OS4 and OP4 are compared, the first octets OS1 and OP1 are compared and finally the third octets OS3 and OP3 are compared. If one of the four octet comparisons is negative, access to the service of the card is denied.

At the time of a second verification of the presented code following a first use of the card, the transformation function FT again modifies the order of the transformed octets starting with the fourth octets OS4. Thus the transformed secret code at the time of this second presentation becomes the following:

$$CST=FT[CST(OS2, OS4, OS1, OS3)]=(OS4, OS3, OS2, OS1).$$

The presented code then undergoes two permutations in order to obtain the following transformed presented code:

$$CPT=FT[FT[CP(OP1, OP2, OP3, OP4)]]=(OP4, OP3, OP2, OP1).$$

Thus, at each presentation of the presented code CP, the permutation is applied to the transformed secret code CST resulting from the last presentation, and the permutation is also applied to the presented code CP, but a number of times equal to the number of previous permutations/presentations of the presented code. The corresponding parts of the permuted secret and presented codes CST, CPT are compared in pairs and the permuted secret code CST is stored in the card CA when the compared codes CST and CPT are identical.

The octets OS1 to OS4 of the secret code CS are thus never manipulated in the same order during two successive verifications of the presented code.

In order to increase security, the transformation function FT, to which there is applied the secret code CS at the step E2 or CST at the step E6a, or else to which there is applied any other transformed secret code. $CST_{i-1}$ at the step E6b according to the previous embodiments, is homomorphic of the function FT, denoted hereinafter FT', to which there is applied the presented code CP at the step E6 or at the step E6a, or $CPT_{i-1}$, at the step E6b.

Each card supplier can choose their own transformation function FT homomorphic of a predetermined function FT', or else a pair of functions [FT, FT'], which protects it against attacks.

According to a first example, the functions FT and FT' are squarings of the sum of a confidential code and a random number NA. At the time the card is brought into service at the step E2 or E62, or at the time the secret code associated with the card is changed, the secret code CS undergoes the following transformation FT:

$$CST=FT(CS,NA)=CS^2+2CS \cdot NA+NA^2,$$

that is to say the transformed secret code CST results from the following successive calculations: calculation of CS squared, calculation of the double product 2 CS·NA, calculation of NA squared, and addition of the preceding three products.

The function FT' applied to the presented code CP is also a squaring of the sum of this code with the random number NA. However, the calculation of the transformed presented code CPT follows a different process from the calculation of the secret code by the transformation FT. Thus the presented code CP is calculated according to the formula:

$$CPT=FT'(CP,NA)=(CP+NA)^2,$$

starting by calculating the sum CP+NA, and then multiplying this sum by itself in order to obtain the presented code CPT.

Thus the process of calculating the presented code CPT at the step E6 is different from that for the secret code CST at the step E2 and therefore the wavelets corresponding to these two transformations are different.

According to a second example, the function FT applied to the secret code CS is such that $CST=NB^{CS} \times NB^{NA}$, that is applied by calculating the product of the number NB by itself CS times and the product of NB by itself NA times, and by multiplying the preceding two products. The transformed presented code CPT is calculated according to the formula $CPT=FT'(CP, NA)=NB^{CP+NA}$, that is to say by calculating the product of NB by itself CP+NA times. NB designates any number whatsoever which is transmitted with the secret code CS and the random number NA to the card CA in order to be written therein in the memory MNV, at the step E3.

In the above description, it should be understood that smart card covers all known types of smart card, also referred to as microcontroller cards, such as cards with contacts or contactless cards stated below by way of a non-limitative example: credit cards (Visa cards), payment cards, telephone cards, SIM cards, "add-on" cards, purchasing centre cards, gaming cards, etc. More generally, the invention relates not only to smart cards but also other portable electronic objects designated equally well by electronic data processing means, such as electronic assistants or organisers, electronic purses, tokens, pocket calculators, etc.

The accepting terminal of the electronic data processing means can for example be of the type of a computer terminal, a personal computer, in particular a portable one, a bank terminal, a point-of-sale terminal, a radiotelephone terminal, a device for controlling access to premises or to a strong room, etc. The accepting means can be remote from the data processing means, these being connected by any data transmission means.

The confidential code in the sense of the invention is also designated in certain contexts as password, or secret code, or else PIN (Personal Identification Number) or CHV (Card Holder Verification) or PTI (Personal Telecommunication Identifier) in particular for radiotelephone terminal SIM cards.

The received confidential code is in general an alphanumeric code. It can be applied to the data processing means, smart card or portable electronic object, by any known code entry means, other than a pushbutton keyboard, for example by voice and voice recognition, or else by recognition of a biometric signature, for example at least a fingerprint.

The invention claimed is:

1. A method for accessing a data processing means associated with a secret confidential code and accessible by applying thereto a confidential code presented by an accepting means, comprising the following steps:
    implementing a code transformation function in the processing means of a smart device,
    transforming the secret code into a transformed secret code in the processing means of the smart device according to the transformation function,
    storing the transformed secret code in the processing means of the smart device; and
    at each use of the processing means of the smart device, transforming the presented code, in the processing means of the smart device, into a transformed presented code according to the transformation function implemented in the processing means, comparing the transformed secret code with the transformed presented code in the processing means of the smart device, and selectively providing access to the data processing means based on said comparison, without accessing the secret code,
    wherein each transformed secret code or transformed presented code results from application of the respective secret code or presented code and a random number to the transformation function, wherein the random number is pre-stored with the transformed secret code in the processing means of the smart device.

2. The method in accordance with claim 1, wherein the transformation function is irreversible.

3. The method in accordance with claim 1, wherein the transformation function is a hashing function.

4. The method in accordance with claim 1, wherein two data processing means associated with identical secret codes are associated with different random numbers.

5. A The method in accordance with claim 1, wherein the random number is modified when the secret code associated with the processing means is modified.

6. The method in accordance with claim 1, wherein the smart device is a smart card.

7. A method for accessing a data processing means associated with a secret confidential code and accessible by applying thereto a confidential code presented by an accepting means, comprising the following steps:
    implementing a code transformation function in the processing means, transforming the secret code into a transformed secret code in the processing means according to the transformation function, storing the transformed secret code in the processing means;

at each use of the processing means, transforming the presented code into a transformed presented code according to the transformation function implemented in the processing means, comparing the transformed secret code with the transformed presented code in the processing means, and selectively providing access to the data processing means based on said comparison, without accessing the secret code; and applying the secret code and a first random number to the transformation function, producing a second random number in the processing means before each transformation of the presented code, determining a second transformed secret code by applying the stored transformed secret code and the second random number to the transformation function, determining the transformed presented code by applying the presented code and the first random number to the transformation function to produce an intermediate transformed presented code, applying the intermediate transformed presented code and the second random number to the transformation function, and comparing the second transformed secret code with the transformed presented code.

8. A method for accessing a data processing means associated with a secret confidential code and accessible by applying thereto a confidential code presented by an accepting means, comprising the following steps:

implementing a code transformation function in the processing means, transforming the secret code into a transformed secret code in the processing means according to the transformation function, storing the transformed secret code in the processing means; and at each use of the processing means, transforming the presented code into a transformed presented code according to the transformation function implemented in the processing means, comparing the transformed secret code with the transformed presented code in the processing means, and selectively providing access to the data processing means based on said comparison, without accessing the secret code;

wherein, for each presentation of the presented code, an iteration comprising the following steps is carried out:

applying the transformation function to a transformed secret code stored during a previous iteration;

applying the transformation function to the presented code as many times as the number of iterations respectively corresponding to previous presentations of the presented code;

comparing the transformed secret code and the transformed presented code; and storing the transformed secret code in the processing means.

9. A method in accordance with claim 8, wherein the number of iterations is represented by an index i, and wherein the applications of the transformation function to the presented code are performed by an application of a transformation function equivalent to the $i^{th}$ iteration of the transformation function in order to produce a transformed presented code to be compared with the transformed secret code, and the number i of iterations is stored with the transformed secret code resulting from the previous application in the processing means.

10. A method for accessing a data processing means associated with a secret confidential code and accessible by applying thereto a confidential code presented by an accepting means, comprising the following steps:

implementing a code transformation function in the processing means, transforming the secret code into a transformed secret code in the processing means according to the transformation function;

storing the transformed secret code in the processing means; and at each use of the processing means, transforming the presented code into a transformed presented code according to the transformation function implemented in the processing means, comparing the transformed secret code with the transformed presented code in the processing means, and selectively providing access to the data processing means based on said comparison, without accessing the secret code;

wherein the transformation function consists of dividing each code into a number of parts and applying a predetermined permutation to the parts of the code, and wherein, at each presentation of the presented code, the permutation is applied to the transformed secret code resulting from the last presentation, the permutation is applied to the presented code a number of times equal to the number of previous permutations of the presented code, the corresponding parts of the permuted secret and presented codes are compared in pairs, and the permuted secret code is stored in the processing means.

11. A method for accessing a data processing means associated with a secret confidential code and accessible by applying thereto a confidential code presented by an accepting means, comprising the following steps:

implementing a code transformation function in the processing means, transforming the secret code into a transformed secret code in the processing means according to the transformation function;

storing the transformed secret code in the processing means; and at each use of the processing means, transforming the presented code into a transformed presented code according to the transformation function implemented in the processing means, comparing the transformed secret code with the transformed presented code in the processing means, and selectively providing access to the data processing means based on said comparison, without accessing the secret code;

wherein the transformation function to which the secret code is applied is homomorphic of the transformation function to which the presented code is applied.

* * * * *